Oct. 6, 1936.  S. JANSEN  2,056,576
MANUFACTURE OF YEAST
Filed Nov. 17, 1934  2 Sheets-Sheet 1

Oct. 6, 1936.      S. JANSEN      2,056,576
MANUFACTURE OF YEAST
Filed Nov. 17, 1934      2 Sheets-Sheet 2
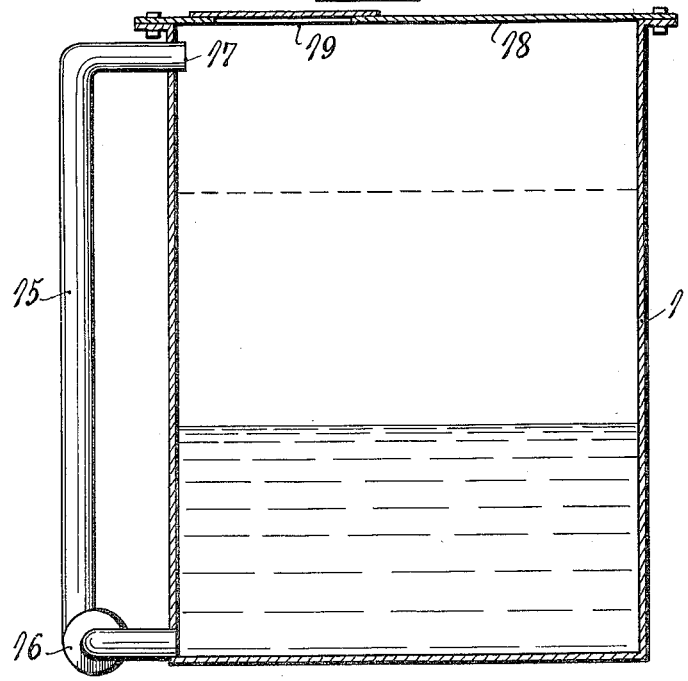
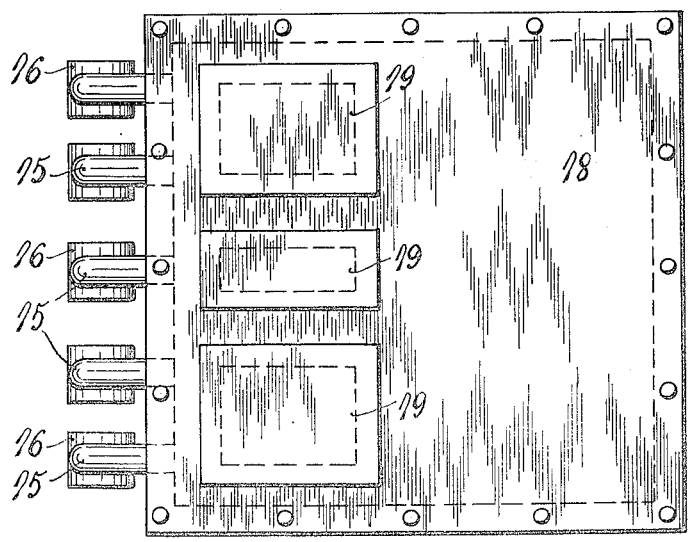
Inventor
Sigurd Jansen,
By Sommers & Young Attys.

Patented Oct. 6, 1936

2,056,576

UNITED STATES PATENT OFFICE 2,056,576

MANUFACTURE OF YEAST

Sigurd Jansen, Oslo, Norway

Application November 17, 1934, Serial No. 753,541
In Norway February 20, 1930

2 Claims. (Cl. 195—95)

This invention relates to the manufacture of yeast and has for its object a process, by means of which it is made possible, besides a satisfactory output of yeast, to obtain also a considerable quantity of alcohol as a by-product.

This application is a continuation-in-part of my application Serial No. 463,983, filed June 26, 1930.

The process at present usually employed in the manufacture of yeast, the socalled "air yeast manufacture", is based on the assumption that it is a necessary condition for a strong propagation of the yeast cells that the propagation takes place in the presence of an abundant supply of oxygen, and the operations and apparatus employed in the actual manufacture have therefore been chosen with the conscious purpose of bringing about the greatest possible intimacy of contact between the air and every portion of the liquid, in which the growth of the yeast is taking place.

The vessels in which the yeast is propagated are for this purpose provided with air distribution means, which in part are of a rather complicated character, and it is through these distributing contrivances that the air is blown into the fermenting liquid. According as the requirements to greater output of yeast have increased, the amount of air supplied during the fermentation has been gradually increased to obtain such rise in output, because the opinion has prevailed that the amount of oxygen (air) which is caused to pass through fermenting liquid, has been one of the most decisive conditions for obtaining large outputs of yeast.

In modern air yeast manufacture the rate of flow of air is usually from 12-16 and up to 25 cubic metres of air to each cubic meter of wort per hour (see Georg Foth: Handbuch der Spiritusfabrikation (1929) page 605, lines 1-11).

In the air yeast manufacture carried out according to these principles, large outputs of yeast are actually obtained, but this result is achieved on the expense of the output of alcohol, because the alcohol formed during the fermentation is blown away as soon as it is formed. To recover the alcohol is not practically possible owing to the high degree of dilution, in which it is contained in the air.

The present invention has for its object a process whereby large quantities of alcohol are obtained in addition to large outputs of yeast.

An important characteristic feature of the process as compared with known processes of yeast propagation consists therein that the liquid, in which the yeast is grown, is subjected to powerful agitation under such conditions that the alcohol formed during the fermentation is retained in the liquid.

To achieve this end the agitation is effected by means of a wort circulating through closed channels outside of the yeast propagation vat, from the said vat and back into the same with a rate of flow, which is not less than fifteen cubic metres in the hour to each cubic meter of wort contained in the yeast propagation vat, or in other words that the time needed to circulate the entire volume of wort in the vat is less than about three minutes.

The withdrawal and reintroduction respectively may take place at one single point or at several points. The points of withdrawal and return may also be arranged in various ways in relation to one another for example so that the main flow of liquid will pass either in a horizontal or a vertical direction through the vat. One may also make use of a combination of two or more different means of agitation.

The observation has been made that it is a necessary condition of obtaining satisfactory results that the volume of liquid circulating through the system is very large.

This will appear from the results of experiments given below:

Three comparative fermentation tests (I, II and III) were made, in which the conditions of operations were the same with exception of the velocity of flow through the auxiliary channel.

In the first experiment I the velocity of flow was just sufficient to cause the entire contents of the fermentation vat to pass through the auxiliary channel in the course of 15 minutes.

In the second experiment (II) the same volume of liquid was circulated in the course of 90 seconds and in the third instance (III) the time was 36 seconds.

The outputs were as follows:

| | Time of circulation | Yeast | Output alcohol |
|---|---|---|---|
| I | 15 minutes | 20 percent | 28 percent. |
| II | 90 seconds | 33,5 percent | 21,5 percent. |
| III | 36 seconds | 51,5 percent | 19 percent. |

These experiments prove that the velocity of circulation is of decisive importance.

In the descriptive matter inserted into my prior application Serial No. 463,983 on the 13th of July, 1931, the minimum limit of the rate of flow of wort is stated to be 15 cubic meters per hour for each cubic meter of wort in the fermentation chamber.

From the above experiments, however, it will be seen that the best results are attained by a much higher rate of flow.

A suitable method of carrying the invention into effect by means of circulating wort as an agitation means consists in introducing the circulating wort wholly or in part into the yeast propagation vat at a point above the level of liquid, preferably at such a height and in such a manner as to cause the introduced wort to enter the body of wort in the vat in the form of a splashing jet or spray. To bring about a more or less complete distribution of the entering flow of wort when desired the outlet of the circulation channel or channels may be provided with spreading nozzles of various kinds for example in the form of a sieve so as to produce a douche or in the form of a flattened pipe producing a flat jet. Or distribution plates may be arranged in front of or below the entering flow of wort so that the wort flows into the vat in the form of cascades. The circulating wort may also be introduced into the vat at or below the level of liquid in the form of an upwardly directed jet which is first thrown upward and then falls back into the body of wort in a more or less distributed state.

Also in the case of the wort being introduced in such a way as to splash into the body of wort in the yeast propagation vat the volume of circulation should be very large, and sufficient to cause the entire body of wort in the vat to circulate through the system in a period of time less than 15 minutes. In manufacturing practice it has been found to be suitable to maintain a circulation velocity sufficient to cause the entire volume of wort to pass through the system in less than 5 minutes preferably between 30 and 180 seconds.

In the case of no special spreading or distributing means are arranged the outlet opening or openings (for the entering wort) should preferably be arranged at a considerable height above the level of wort in the vat (for example between 2 and 5 metres above when the circulation time is about 2 minutes).

The manufacture of yeast by the use of the process according to the present invention may as regards the various details be carried out in the same or like way as in other known processes. Thus as a matter of course the process may be applied to the use of any type of nutrients otherwise suitable for the manufacture of yeast and alcohol, such as for example molasses, and sugar solutions obtained by saccharification of cereals, roots, wood, peat, sea weeds, moss etc.

The accompanying drawings illustrate by way of example some apparatus suitable for carrying the invention into effect.

Fig. 2 is a diagrammatic sectional view of a modified type of apparatus with means for circulating the wort through the system.

Fig. 3 is a top view of the apparatus shown in Fig. 2.

Figure 1:
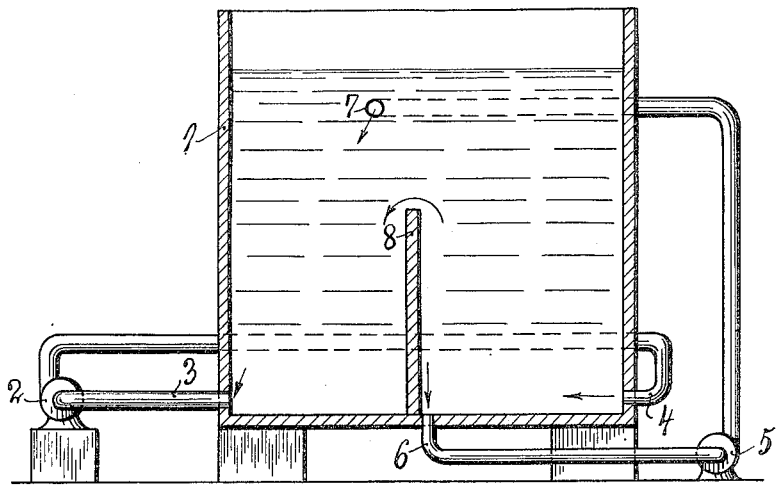
Fig. 1 is a diagrammatical section of an apparatus in which circulating wort is used as an agitation means.

In the example illustrated in Fig. 1, the reference numeral 1 designates the fermentation vessel, 2 and 5 are centrifugal pumps, 6 and 3 are pipes through which liquid is drawn from the vessel 1, and 7 and 4 are pipes through which the wort is forced by the pumps back into the fermentation vessel. 8 is a partition dividing the lower part of the vessel 1 into two compartments.

In Figs. 2 and 3 the apparatus comprises a yeast propagation vat 1, circulation conduits 15 with outlets 17, centrifugal pumps 16. The vat 1 has a cover 18 with openings 19.

Example

The fermentation is presumed to take place in the fermentation vessel illustrated in Fig. 1.

100 kg. of molasses are purified as usual. The clear solution having a concentration of about 18° Balling is introduced into a storage tank.

In the circulation pipes (3, 6) of the fermentation vessel 1 are inserted powerful centrifugal pumps (2 and 5) having a total capacity of 200 liters in the minute. One of the said pumps (2) causes the liquid to circulate from the bottom of the vessel and back to a point at the bottom, while the other (5) at the same time causes liquid to circulate from the bottom and back to a point near the level of the liquid.

The fermentation vessel (1) is charged with water and so much of purified molasses solution from the storage tank that the vessel (1) contains about 1550 liters of 1.3° Balling strength.

Into the storage tank with the remainder of purified molasses solution is introduced water in a quantity sufficient to produce a total volume of 1000 liters.

The wort in the fermentation vessel is supplied with start yeast, and the fermentation is thereupon effected at the usual temperature (about 30° C.). Wort from the storage tank is continuously introduced into the fermentation vessel 1 and the necessary nutrient salts are added periodically during the fermentation process. The motion of the yeast cells in the liquid is brought about by means of the circulating wort passing through the pumps.

It will be seen from the above that when the circulation means are in operation the rate of flow of the wort through the fermentation vat will be as follows:

At the start the volume of wort in the vat is about 1550 litres. The volume of wort withdrawn and reintroduced into the vat being 200 litres in the hour, the entire volume of wort in the vat at the start (viz. 1555 litres) will then need about 460 seconds (7 minutes, 40 seconds). To circulate a volume of wort corresponding to the entire volume of wort in the vat thus requires between 7 and 8 minutes. This means that the volume of wort withdrawn and reintroduced is about 7.82 m³ in the hour to each cubic metre of wort in the vat.

At the end of the fermentation operation when the entire volume of solution in the storage tank has been introduced into the vat the total volume of fermenting wort will be about 2550 litres.

This means that the time needed to circulate the entire volume of wort will then be 765 seconds (12 minutes, 40 seconds). The volume of circulating wort will then be 4.7 m³ in the hour to each cubic meter of wort in the vat.

The rate of flow during the fermentation operation considered as a whole will then be between 4.7 m³ and 7.82 cubic meters in the hour to each cubic meter of wort in the vat. Or in other words, a volume of wort corresponding to the entire volume of wort in the vat is caused to be withdrawn and reintroduced in a period of time between 7 minutes, 40 seconds, and 12 minutes, 40 seconds.

The fermentation operation is finished in the course of about 13 hours. The yeast is then separated from the liquid and further treated as usual in the manufacture of yeast. The alcoholic liquid is thereupon subjected to a distillation process to recover the alcohol contained therein.

The output of yeast is satisfactory, and at the same time an output of alcohol is obtained, which is nearly as high as in the ordinary processes of manufacturing alcohol wherein yeast is not produced.

The quality of the resulting yeast is fully equal to that of yeast obtained in the usual manner both in respect of baking power, flavour and keeping qualities.

An apparatus of the type illustrated in Figs. 2 and 3 is made use of. The fermentation vat is presumed to be of rectangular cross sectional area, one side being about 4 meters and the other about 5 meters. The height is about 5.20 meters. The vat is covered by a cover (16) having three openings each of about 1 m² area. Over each of the openings are placed independently adjustable slide covers.

From the bottom of the vat 1 five pipes (15) of 400 mm. diameter each pass upward outside of the vat to points near the top edge of the vat, where they open into the vat (at 17) besides each other in about the same height. In each pipe is inserted a centrifugal pump of the axial type. The rotor of the pumps makes about 1500 revolutions in the minute.

During the operation of the apparatus a volume of wort rising from 50 to 80 m³ is maintained in the vat (prepared by the use of about 5000 kg. of molasses).

The distance from the level of liquid to the outlets (17) for the circulating wort is about 3 m. at the start. The volume of wort is increased during the operation, so that the level of liquid rises to between 1 and 1.5 metres below the outlets (17) at the end of the operation.

The capacity of the pumps is of such value as to cause the entire contents of the vat to circulate in the course of about three minutes. During the operation all of the pumps are driven with full capacity.

By the use of an apparatus of the type illustrated in Fig. 2 the vat may be kept quite open during the yeast propagation. But it is usually preferred to hold the vat partly closed by a cover so arranged as to allow of adjusting the size of the opening as desired. The fact is that it has been found that it is possible by altering the size of the opening and thereby also the readiness of escape of the evolved carbon dioxide, to alter the proportion between the outputs of yeast and of alcohol. By decreasing the size of the opening the output of alcohol in relation to the output of yeast may be increased and vice versa.

A suitable arrangement consists in providing the vat with a cover having one or more openings (with a total area of for example about a fifth of the total area of the cover). These openings may be provided with adjustable covers, for example as illustrated in Fig. 3 of the drawings.

When the circulating wort is caused to enter the vat at points above the level of the wort the air present in the vat comes in intimate contact with the wort at the point of the entrance. The larger the openings in the cover are, the more fresh air will be taken up in the wort under fermentation in the vat. If it is desired to augment the aeration of the wort effected in this way for example in order to obtain a relative increase of the output of yeast, this may be attained by causing increased circulation of air in the space above the level of wort or more particularly in the space surrounding the entering wort. To attain this, air may be blown or drawn into the vat above the wort, for example through perforated distribution pipes arranged between the wort inlets and the level of the body of wort in the vat. Air distribution pipes for the purpose may for example also be disposed below distributing plates over which the entering wort is caused to flow.

Changes in the relation between the outputs of alcohol and yeast may also be attained by altering the degree of dilution of the wort. By increased dilution, increased outputs of yeast and decreased outputs of alcohol can be attained. The same result can also be achieved by increasing the quantity of start yeast. When the quantity of start yeast is increased the output of yeast can be increased on cost of the outputs of alcohol.

It has also been found that the revolution number of the centrifugal pumps is of great importance to attain large outputs of yeast and of alcohol. Within certain limits the outputs increase with increasing rotation velocities of the pumps. It is therefore preferred to use pumps with high revolution numbers. The velocities of the pumps should in most instances be higher than 300 revolutions in the minute, preferably between 600 and 1500 revolutions in the minute. Centrifugal pumps of the axial type have been found to give the best results.

It is possible to obtain satisfactory results by means of one single circulation conduit with inserted centrifugal pump. But it is preferred to arrange a plurality of circulation conduits each with its own pump (as in the illustrated example).

Each of the individual conduits may be so arranged as to be capable of being brought into communication with one another for example between the vat and the pumps. By this means one may be capable of raising or lowering the pressures in the conduits according to desire.

It has been found of advantage to operate with comparatively strong suction (vacuum) in the suction pipes. Such increased suction can be attained by suitably dimensioning the circulation conduits.

All or some of the suction parts of the pipes should have their inlets disposed at or near the bottom of the fermentation vat. The circulation conduit may open into the vat at different places and in different heights. In general, however, it is preferred to arrange the outlets in such a way as not to produce oppositely directed jets of wort.

In order to obtain good results it is further of importance that the yeast propagation plant is operated in such a manner as to avoid as far as possible that foam or carbon dioxide bubbles are drawn along from the body of wort in the vat and into the circulation conduit. This may be attained by various means well known to persons skilled in the art.

I claim:

1. A process of manufacturing yeast, which comprises propagating yeast cells in a body of wort enclosed in a confined yeast propagation chamber, violently agitating the said body of wort by means of withdrawing wort with propagating yeast cells from the body of wort in the said yeast propagation chamber at a point near the bottom of said chamber and reintroducing the withdrawn wort with its contents of yeast cells in the body of wort in the yeast propagation chamber at the top of the said chamber, the rate of flow of the withdrawn and reintroduced wort being sufficient to cause a volume of wort corresponding to the entire body of wort in the chamber to be withdrawn and reintroduced in a period of time less than about three minutes.

2. Process according to claim 1, in which the withdrawn wort is reintroduced into the yeast propagation chamber at a point considerably above the level of wort so as to cause a great volume of wort to splash forcibly into the wort surface.

SIGURD JANSEN.